United States Patent
Abend et al.

[11] Patent Number: 6,044,941
[45] Date of Patent: Apr. 4, 2000

[54] CLUTCH-BRAKE INTERLOCKING MECHANISM FOR STARTING AND STOPPING VEHICLE

[75] Inventors: Robert Abend; Travis McCloud, both of Morristown, Tenn.; Hiroaki Shimizu; Koji Irikura, both of Hyogo-ken, Japan

[73] Assignees: Kanzaki Kokyukoki Mfg. Co., Ltd., Hyogo-ken, Japan; Tuff Torq Corporation, Morristown, Tenn.

[21] Appl. No.: 09/193,678

[22] Filed: Nov. 17, 1998

[51] Int. Cl.[7] ................................................ B60K 41/24
[52] U.S. Cl. ...................................... 192/13 R; 192/13 A
[58] Field of Search ............................. 192/13 R, 13 A, 192/12 R, 18 R, 995, 66.22

[56] References Cited

U.S. PATENT DOCUMENTS

| | | |
|---|---|---|
| 4,858,739 | 8/1989 | Nemoto .................................. 192/18 R |
| 5,617,936 | 4/1997 | Nemoto .................................. 192/4 A |

FOREIGN PATENT DOCUMENTS 62-103778  7/1987  Japan .

*Primary Examiner*—Charles A. Marmor
*Assistant Examiner*—Tisha D. Waddell
*Attorney, Agent, or Firm*—Knobbe, Martens, Olson & Bear, LLP

[57] ABSTRACT

A clutch-brake interlocking mechanism interlocks a brake with a clutch to prevent the brake and the clutch from being disengaged simultaneously so as to prevent a vehicle from inadvertently moving on a slope. The interlocking mechanism includes: (a) a friction clutch 10 including a drive-side member 11 and a driven-side member 12, wherein the drive-side member 11 and the driven-side member 12 are engaged when the drive-side member 11 is pressed toward the driven-side member 12; (b) a friction brake 20 including a brake member 22 (and 23) and a brake disk 21, wherein the brake member 22 and the brake disk 21 are engaged when the brake member 22 is pressed toward the brake disk 21; and (c) a coupling member 30 for pressing the drive-side member 11 and the brake member 22. The coupling member 30 is pivotable and has a structure such that when the coupling member 30 is pivoted to a first position, the drive-side member 11 is fully pressed while the brake member 22 is not pressed, when the coupling member 30 is pivoted to a second position, the drive-side member 11 is not pressed while the brake member 22 is fully pressed, and when the coupling member 30 is pivoted between the first position and the second position, both the drive-side member 11 and the brake member 22 are halfway pressed.

12 Claims, 8 Drawing Sheets

CLUTCH-BRAKE INTERLOCKING MECHANISM FOR STARTING AND STOPPING VEHICLE

BACKGROUND OF THE INVENTION

The present invention relates to a clutch-brake interlocking mechanism for use in vehicles such as tractors, as installed inside the transmission thereof.

To prevent vehicles from inadvertently moving rearward or forward in manipulating the transmission for speed changes on sloping roads, it is conventional practice to use a mechanism for interlocking the brake with the clutch. Such an interlocking mechanism is disclosed, for example, in Unexamined Japanese Utility Model Publication No. 103778/1987.

The interlocking mechanism disclosed in the publication comprises a first linkage connecting a clutch/brake pedal at the driver's seat to a tension clutch provided between an engine output shaft and a transmission input shaft, a second linkage connecting the first linkage to a brake, and a third linkage connecting the second linkage to a brake lever at the driver's seat. With the brake actuated by moving the brake lever, the clutch/brake pedal is stepped on to disengage the clutch from its engaged state, precluding the likelihood that both the clutch and the brake will be disengaged or released at the same time, whereby the vehicle can be prevented from moving rearward or forward inadvertently.

The disclosed mechanism nevertheless has the following drawback. The mechanism has a brake pedal in addition to the clutch/brake pedal, therefore comprises an increased number of components and requires a complex linkage for interconnecting these pedals, consequently making the vehicle itself more costly.

With the disclosed mechanism, the linkages interlocking the clutch and the brake are provided externally of the transmission and are accordingly complex and large-sized. This also results in an increased cost. The linkages, which are left exposed, are affected by soot and dust and become less durable.

Further with the disclosed mechanism, the clutch and the brake must be set for and adjusted to a half-engaged or half-actuated state, with the transmission installed in the vehicle, hence a poor work efficiency.

An object of the present invention, which has been accomplished to overcome the foregoing problems, is to provide a clutch-brake interlocking mechanism which is adapted to prevent both the clutch and the brake from becoming disengaged or released at the same time and which is inexpensive and highly durable and has a simple construction permitting facilitated adjustment of the clutch to the half-engaged state.

SUMMARY OF THE INVENTION

To fulfill the above object, the present invention provides a clutch-brake interlocking mechanism for use in a gear transmission for starting and stopping a vehicle, the transmission having a casing, and a drive shaft and a driven shaft arranged approximately in parallel to each other within the casing, the mechanism being adapted to interlock a clutch device supported on the drive shaft with a brake device, the brake device having a brake disk supported on the driven shaft and a brake member disposed within the casing for applying a braking force to the brake disk; the clutch device being a friction clutch having a drive-side member and a driven-side member for producing a frictional force therebetween when the two clutch members are subjected to pressure to deliver a drive force from the drive-side member to the driven-side member; the brake device being a friction brake wherein the brake member is pressed against the brake disk to produce a frictional force therebetween for braking; the interlocking mechanism being characterized in that the mechanism comprises a coupling member including a pivot rotatably supported by the casing and having one end extending outward from the casing, and a clutch control member and a brake control member both arranged within the casing and pivotally movable with the rotation of the pivot; and a connecting member connecting said one end of the pivot to an operating member provided at a driver's seat; the clutch control member and the brake control member being pivotally movable with the movement of the operating member between a first position wherein the clutch device is engaged and the brake device is released and a second position wherein the clutch device is disengaged and the brake device is applied, and being positioned at an intermediate position, where is between the first position and the second position, wherein the clutch device is half-engaged and the brake device is half-applied.

Preferably, the pivot is provided at said one end with an arm pivotally movable with the rotation of the pivot within predetermined limits; the connecting member connecting the operating member to the arm; the arm being pivotally movable within the predetermined limits by the operating member to bring the clutch control member and the brake control member to the first position, the intermediate position and the second position.

Preferably, the drive-side member and the brake disk member can be each movable axially thereof; the coupling member being disposed between the drive-side member and the driven side member; the clutch control member and the brake control member being positionable in the first position to press the drive-side member against the driven-side member with a first force without pressing the brake member by the brake control member; the clutch control member and the brake control member being positionable in the second position to press the brake member against the brake disk with a second force without pressing the clutch member by the clutch control member; the clutch control member and the brake control member being positionable in the intermediate position to press the drive-side member against the drive side member with a force smaller than the first force and press the brake member against the brake disk with a force smaller than the second force.

Preferably, the driven-side member can be movable axially thereof; the clutch device further comprising a clutch position fixing member for determining a limit position of axial movement of the driven-side member toward one side, and a clutch biasing member provided between the clutch position fixing member and the driven-side member; the clutch biasing member being in a compressed state beyond an elastically deformed state, in an elastically deformed state and in a spontaneous state when the clutch control member is in the first position, the intermediate position and the second position, respectively.

Preferably, the brake member is movable axially thereof; the brake device further comprising a brake position fixing member for determining a limit position of axial movement of the brake disk toward the other side, and a brake biasing member provided between the brake position fixing member and the brake disk; the brake biasing member being in a spontaneous state, in an elastically deformed state and in a compressed state beyond the elastically deformed state when the brake control member is in the first position, the intermediate position and the second position, respectively.

Preferably, the brake position fixing member is adjustable in axial position from outside the transmission casing.

Preferably, the clutch device is a cone clutch having annular conical friction faces.

Preferably, the driven-side member and the drive-side member are arranged from one side toward the other side axially thereof and are respectively axially immovable and axially movable; the clutch device further comprising a clutch biasing member disposed between the driven-side member and the drive-side member for pressing a friction face of the drive-side member against a friction face of the driven-side member; the brake disk and the brake member being arranged from said one side toward the other side axially thereof so that the brake member is in approximately the same axial position as the drive-side member, the brake disk and the brake member being movable axially thereof; the coupling member being disposed at the other side of the drive-side member and the brake member; the clutch control member and the brake control member being positionable in the first position to engage the clutch device with the biasing force of the clutch biasing member without acting on the drive-side member and release the brake device without acting on the brake member; the clutch control member and the brake control member being positionable in the second position to disengage the clutch device by pressing the drive-side member against the driven-side member with a first force greater than the biasing force of the clutch biasing member and apply the brake device by pressing the brake member against the brake disk with a second force; the clutch control member and the brake control member being positionable in the intermediate position to half-engage the clutch device by pressing the drive-side member against the driven-side member with a force smaller than the first force and half-apply the brake device by pressing the brake member against the brake disk with a force smaller than the second force.

DESCRIPTION OF THE PREFERRED EMBODIMENTS

Embodiment 1

With reference to the drawings concerned, a description will be given of a preferred first embodiment of clutch-brake interlocking mechanism according to the invention.

Figure 1:
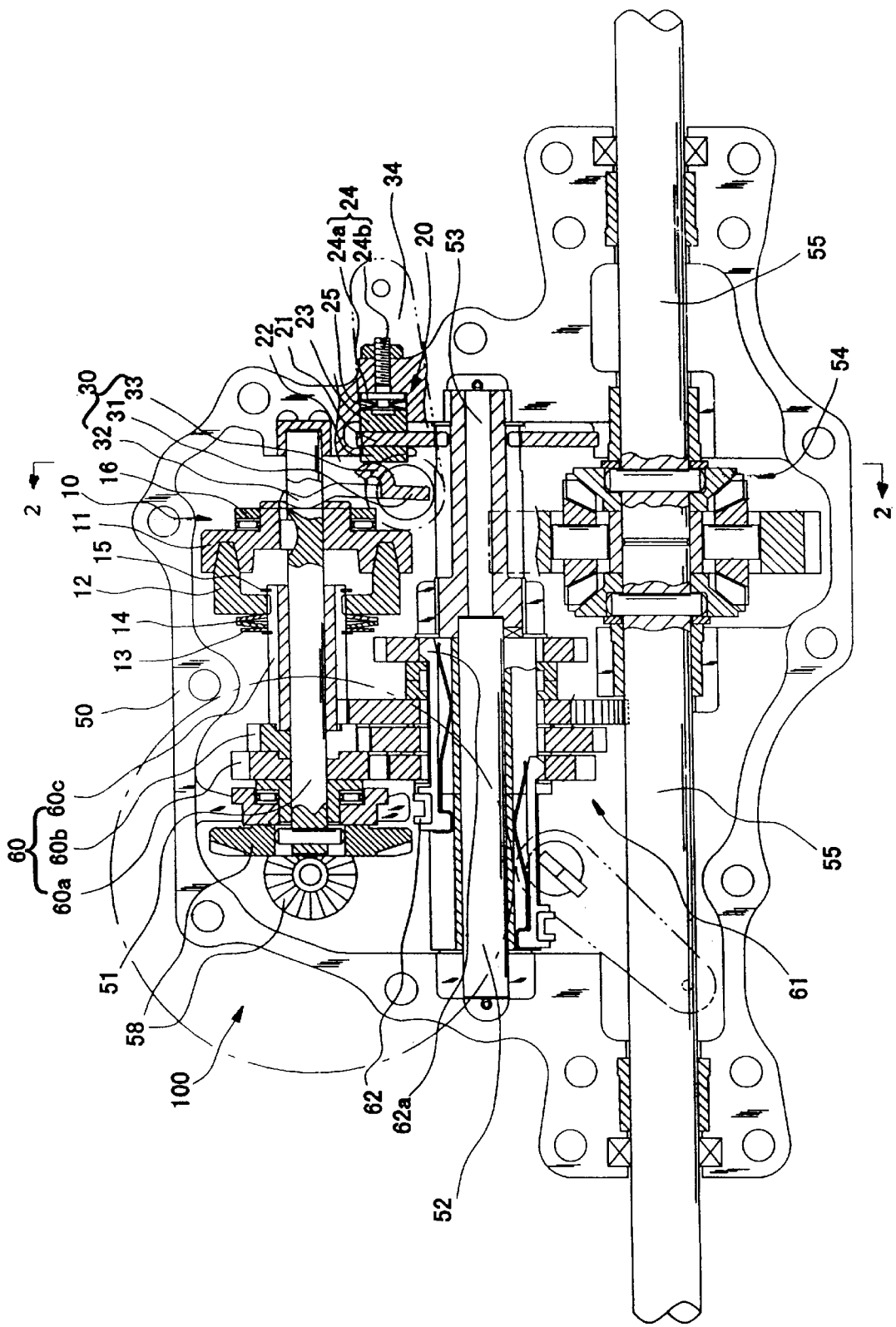
FIG. 1 is a plan view in section of a transmission having applied thereto a preferred first embodiment of clutch-brake interlocking mechanism of the invention.
Figure 2:
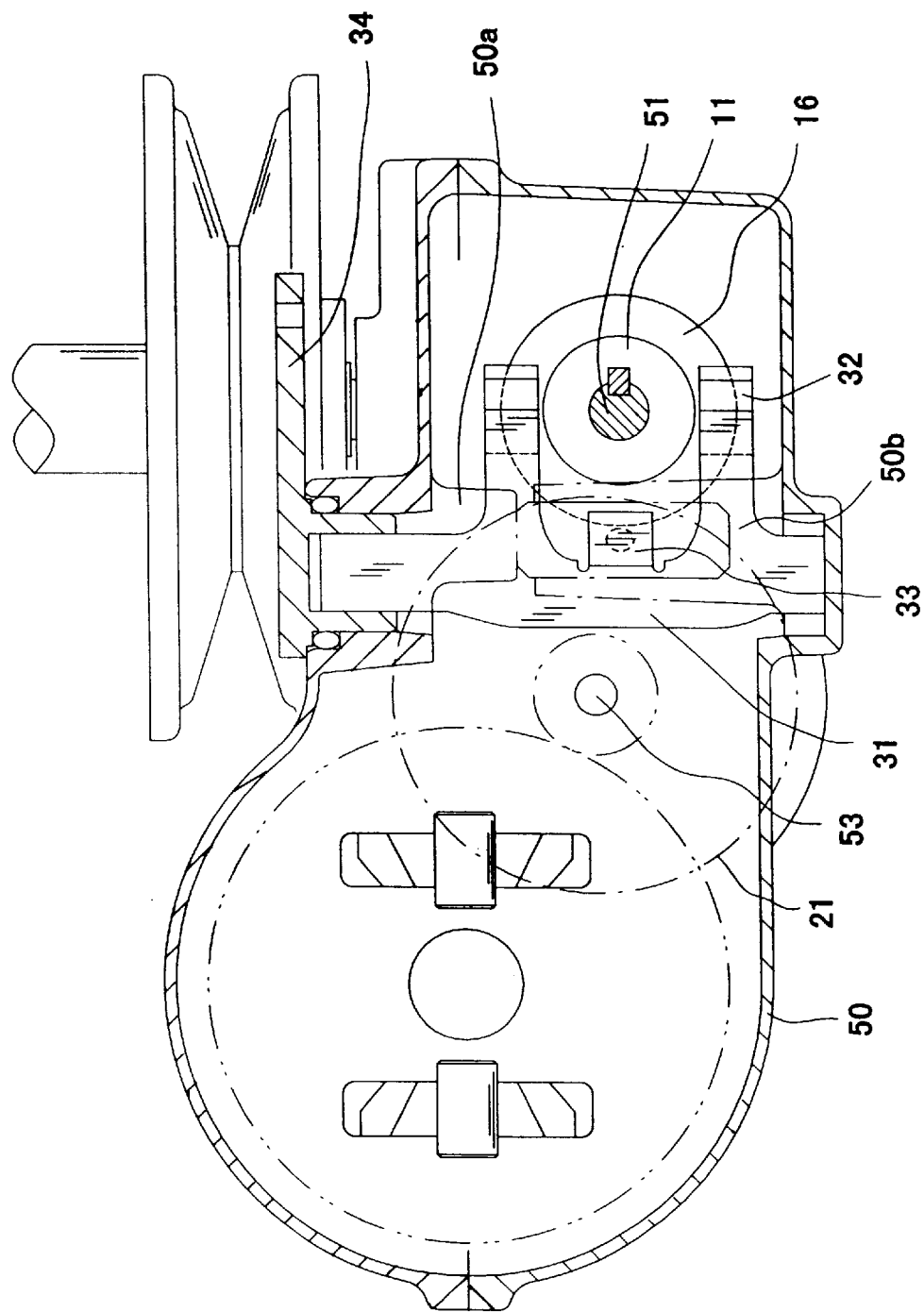
FIG. 2 is a view in section taken along the line A—A in FIG. 1.

FIG. 1 is a plan view in section of a transmission having applied thereto the embodiment of interlocking mechanism of the invention, and FIG. 2 is a view in section taken along the line 2—2 in FIG. 1.

With reference to FIG. 1, the transmission 100 comprises a casing 50, an input shaft (not shown) supported by the casing 50 approximately vertically, a first intermediate shaft 51 supported horizontally by the casing and coupled to the input shaft by a direction change gear train 58 including bevel gears, a second intermediate shaft 52 positioned immediately in the rear of the first intermediate shaft and disposed substantially parallel to this shaft, and an output shaft 53 connected to the second intermediate shaft and nonrotatable relative to this shaft about the axis thereof for delivering a drive force to an axle 55 through a differential gear unit 54. The transmission 100 further has a drive-side speed-change gear train 60 on the first intermediate shaft, and a driven-side speed-change gear train 61 on the second intermediate shaft. In the transmission 100, the first intermediate shaft 51 supporting the gear train 60 thereon and the other shafts disposed at an upstream side of the first intermediate shaft serve as a drive shaft. On the other hand, the second intermediate shaft 52 supporting the gear train 61 thereon and the other shafts disposed at a downstream side of the second intermediate shaft serve as a driven shaft.

The first intermediate shaft 51 serving as the drive shaft has supported thereon the drive-side speed-change gear train 60 and a clutch device 10 which are arranged in this order from axial one side (the left side of the present embodiment as it is seen from above, hereinafter referred to as the "left side") toward the other axial side (hereinafter referred to as the "right side"). On the other hand, the driven-side gear train 61 is supported on the second intermediate shaft 52 serving as the driven shaft. The driven-side gear train 61 is in mesh with the drive-side gear train 60 to provide a speed-change gear mechanism along with the train 60. Disposed at the right side of the casing 50 are a brake device 20 for braking the output shaft 53, and a coupling member 30 for interlocking the brake device 20 with the clutch device 10.

The drive-side gear train 60 has gears corresponding to the number of desired speed changes (three gears in the present embodiment, i.e., a forward third speed gear 60a, forward second speed gear 60b and forward first speed-rearward common gear 60c). The gears are nonrotatable relative to one another as joined together and supported by the first intermediate shaft 51, rotatably relative thereto.

The driven-side gear train 61 has gears meshing with the corresponding gears of the train 60 operatively. Disposed between the second intermediate shaft 52 and the gears of the gear train 61 is an annular shifter 62 which is nonrotatable relative to the shaft 52 and movable axially thereof. The shifter has a key 62a elastically projecting radially outward of the shaft 52. Each gear of the driven-side gear train 61 has a key groove formed in a bearing bore thereof for the key 62a to engage in. Accordingly, when the key 62a is engaged in the key groove of one of the gears of the train 61 by moving the shifter 62, the second intermediate shaft 52 is given a desired speed of rotation in accordance with the gear ratio.

The clutch device 10 comprises a drive-side friction member 11 supported on the first intermediate shaft 51 nonrotatably relative thereto and movable axially thereof, and a driven-side friction member 12 provided at the left side of the member 11. The driven-side member 12 is supported by the forward first speed-rearward common gear 60c of the gear train 60 nonrotatably relative to the gear and movable axially of the first intermediate shaft 51. Thus, the driven-side member 12 is supported by the common gear 60c on the first intermediate shaft 51.

The clutch device 10 further has, mounted on the common gear 60c, a clutch position fixing member 13 for determining a limit position of leftward movement of the driven-side member 12, a clutch biasing member 14 provided between the position fixing member 13 and the driven-side member 12, and a stopper member 15 disposed at the right side of the member 12. In the present embodiment, the biasing member 14 comprises two belleville springs arranged in series. The stopper member 15 serves to prevent the driven-side member 12 from slipping off from the common gear 60c. Preferably, the drive-side member 11 and the driven-side member 12 have complementary recessed and projecting annular conical friction faces, respectively, as illustrated. This prevents the clutch device from becoming large-sized while assuring the friction faces of a sufficient area.

The brake device 20 has a brake disk 21 supported by the output shaft 53 nonrotatably relative thereto and movable axially thereof, and a brake member 22 positioned at the left side of the brake disk 21 for applying a braking force to the brake disk 21. According to the present embodiment, the device 20 further comprises a second brake member 23 at the right side of the brake disk 21 and is adapted to clamp the brake disk 21 by the brake member 22 and the second brake member 23. As indicated in a one-dot chain line in FIG. 2, the brake member 22 and the second brake member 23 are held by holding portions 50a and 50b integral with the casing 50 so as to be movable only laterally of the transmission (axially of the output shaft). The holding portions 50a and 50b can of course be separate from the casing 50.

The brake device 20 further comprises a position adjusting member 24 disposed at the right side of the second brake member 23 for adjusting the position of the brake device 20 laterally of the transmission, and a brake biasing member 25 provided between the position adjusting member 24 and the second brake member 23.

The position adjusting member 24 comprises a head 24a in the form of a disk and positioned inside the transmission casing 50, and a shank 24b extending rightward from the head 24a and having an outer end projecting outward from the casing 50. The shank 24b is externally threaded and extends through a threaded bore formed in the right wall of the casing 50 in screw-thread engagement with the wall. Since the brake member 22, brake disk 21 and second brake member 23 are movable laterally of the transmission as previously stated, the position of these components is adjustable with respect to the lateral direction by the position adjusting member 24 from outside the casing 50.

The coupling member 30 is interposed between the clutch device 10 and the brake device 20 with respect to the lateral direction. Stated more specifically, the clutch position fixing member 13, clutch biasing member 14, driven-side member 12, drive-side member 11, coupling member 30, brake member 22, brake disk 21, second brake member 23, brake biasing member 25 and position adjusting member 24 are arranged from left rightward in the order mentioned when seen from above.

As apparently shown in FIG. 2, the coupling member 30 comprises a pivot 31 supported by the upper wall and the bottom wall of the casing 50 and rotatable about a vertical axis, and a clutch control member 32 and a brake control member 33 which extend horizontally from the pivot 31 and are pivotally movable with the rotation of the pivot 31.

The pivot 31 is operatively connected to a clutch-brake coupling pedal (not shown) at the driver's seat. More specifically, the pivot 31 rotates clockwise as the coupling pedal is stepped on, but conversely rotates counterclockwise as the pedal is returned from the depressed position. The pivot 31 can be operatively connected to the coupling pedal by various members. According to the present embodiment, an arm 34, which has one end connected to the upper end of the pivot 31 and the other end connected to the coupling pedal by a suitable linkage comprising, for example, a rod, is provided (see FIG. 2). Accordingly, the coupling pedal, when moved, pivotally moves the arm 34 to rotate the pivot 31. The linkage further includes a return spring (not shown) for biasing the arm 34 counterclockwise. The return spring has a greater biasing force than the clutch biasing member 14. With the coupling pedal in its inoperative state, therefore, the arm is located at a counterclockwise limit position within the pivotable limits.

The clutch control member 32 is opposed to the right side face of the drive-side member 11, with the brake control member 33 opposed to the left side face of the brake member 22. These control members 32 and 33 are movable with the clutch-brake coupling pedal between a counterclockwise limit position, i.e., a first position (see FIG. 3), where the control members are located when the coupling pedal is in its inoperative state and a clockwise limit position, i.e., a second position (see FIG. 5), where the control members are located when the coupling pedal is stepped on completely.

Figure 3:
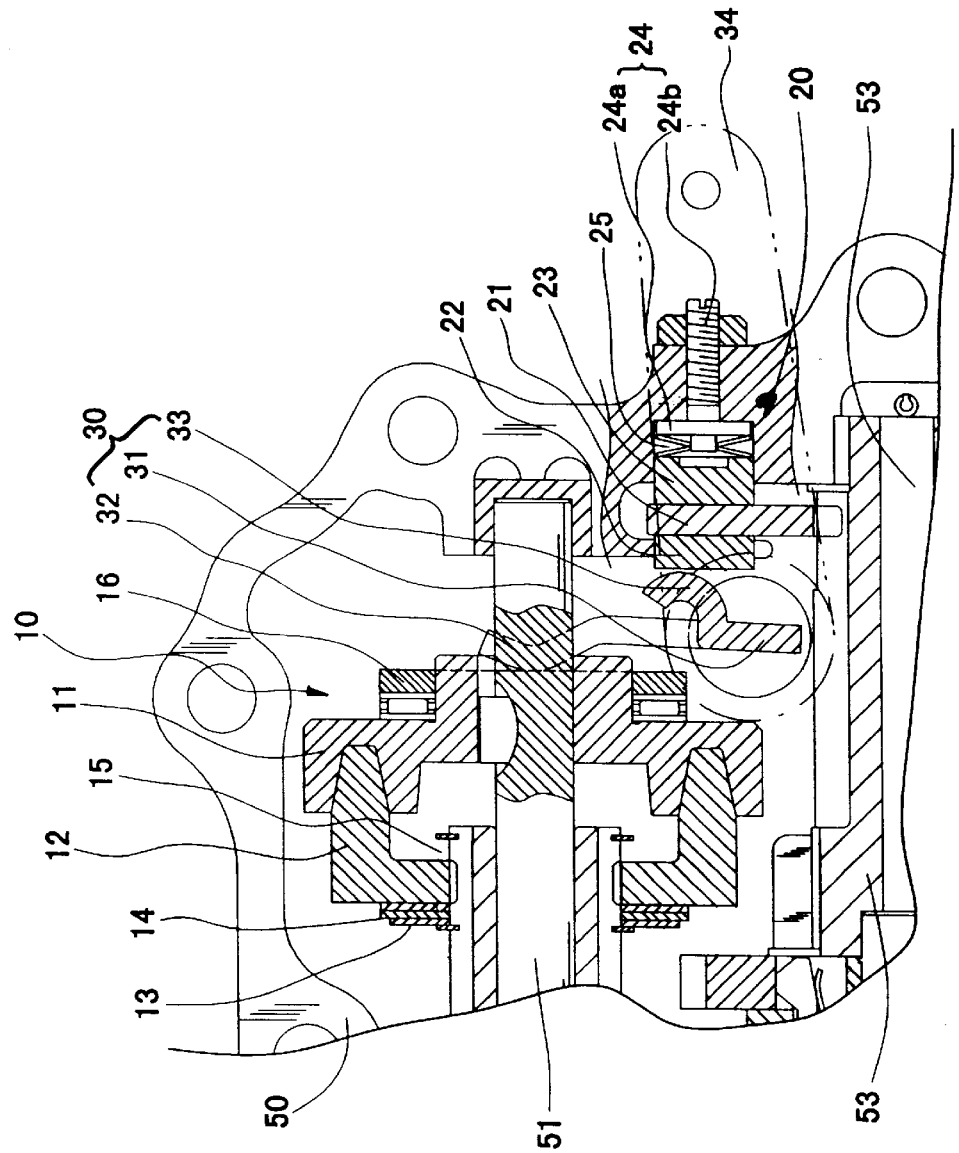
FIG. 3 is an enlarged view of the interlocking mechanism shown in FIG. 1, with the clutch engaged and the brake released.
Figure 4:
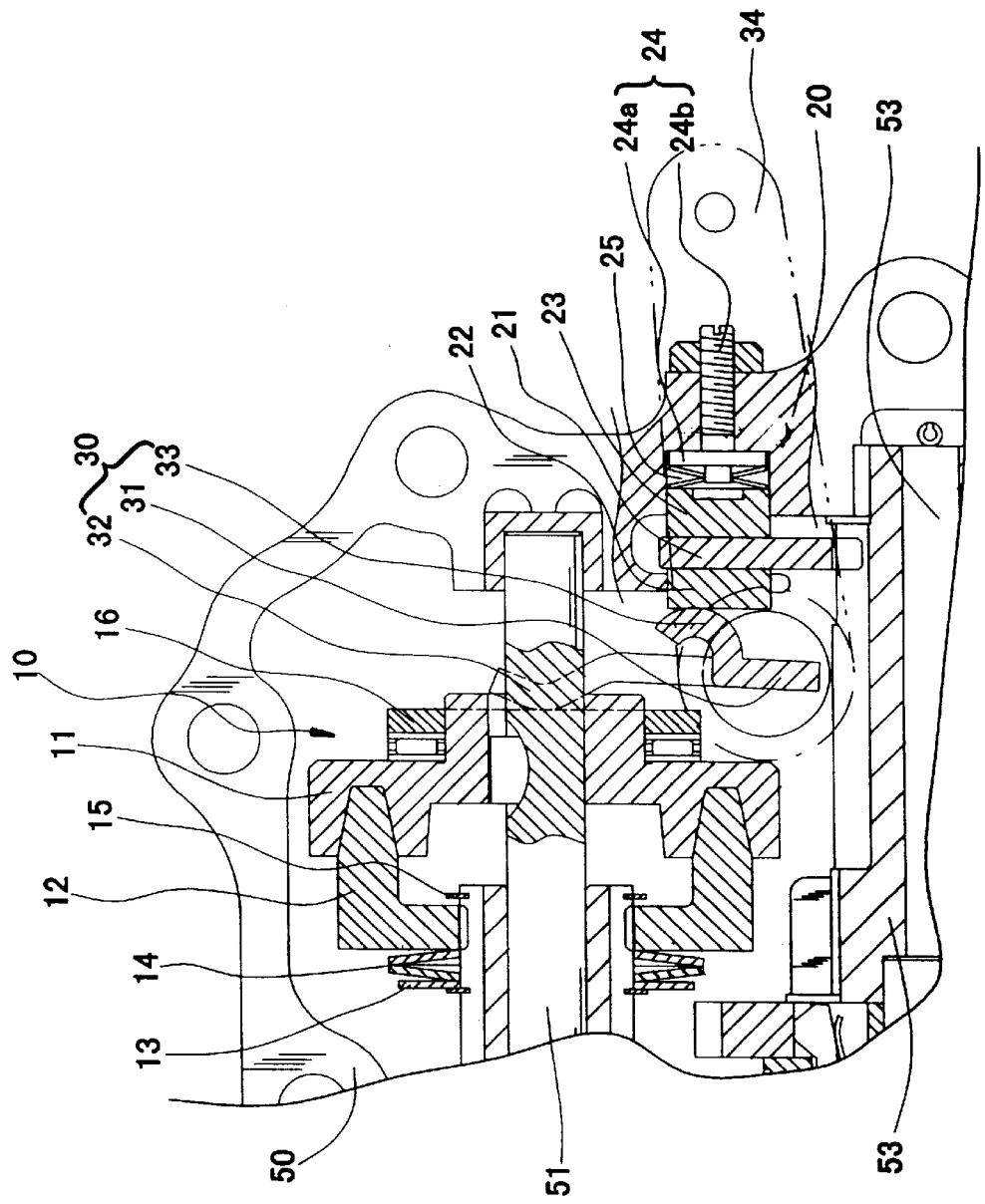
FIG. 4 is an enlarged view of the interlocking mechanism shown in FIG. 1, with the clutch half-engaged and the brake half-applied.
Figure 5:
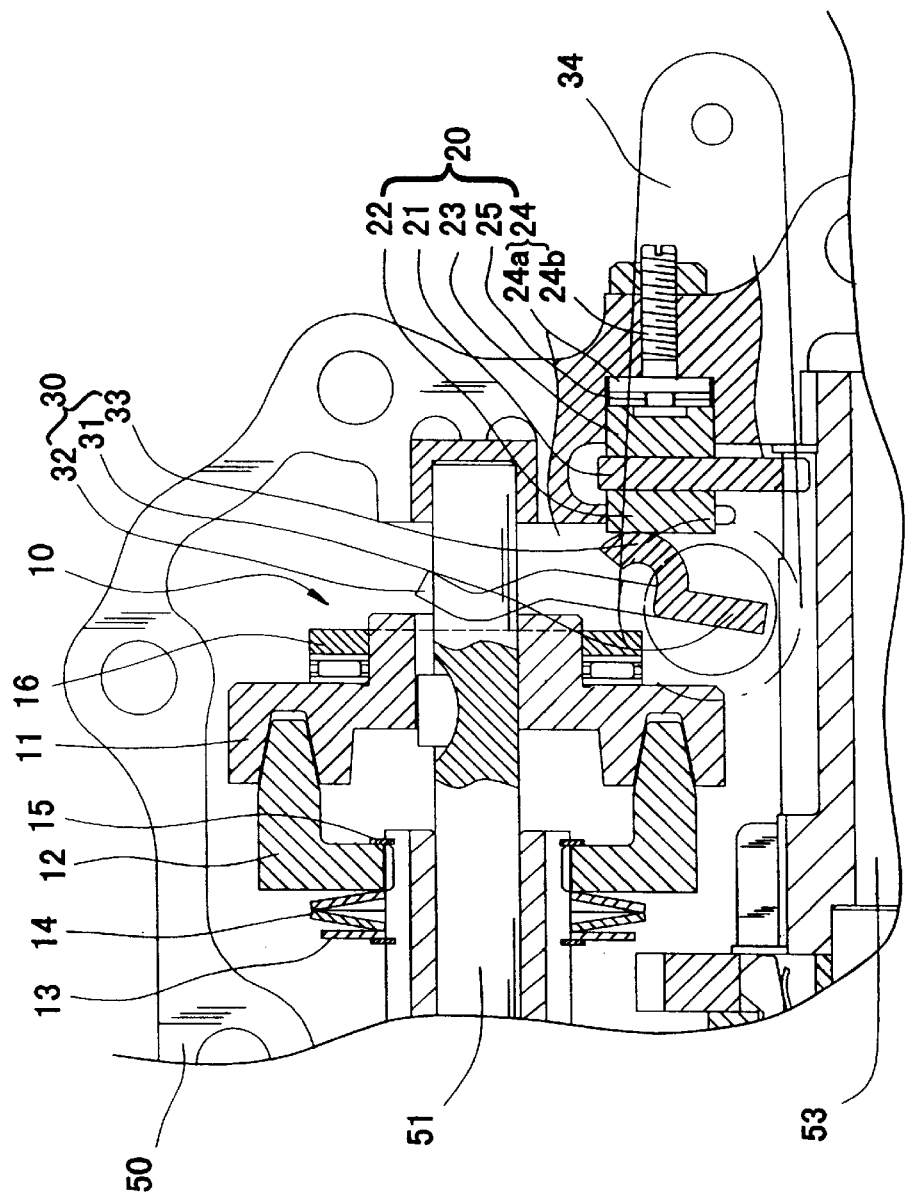
FIG. 5 is an enlarged view of the interlocking mechanism shown in FIG. 1, with the clutch disengaged and the brake applied.

Next, the transmission thus constructed will be described below in respect of the interlocking operation between the clutch device and the brake device with reference to FIGS. 3 to 5. In the following description, the state of the clutch as engaged with the brake released, the state of the clutch as half-engaged with the brake half-applied, and the state of the clutch as disengaged with the brake applied will be referred to as the "state of clutch on," the "state of clutch half-on," and the "state of brake on," respectively. FIGS. 3 to 5 are enlarged views showing the clutch device, the brake device and the vicinity of these devices, with the clutch on, with the clutch half-on and with the brake on, respectively.

The state of clutch on, with the coupling pedal in its inoperative position, will be described first. When the coupling pedal is not stepped on in any way, the arm 34 is in its counterclockwise limit position as already stated. Accordingly, the clutch control member 32 and the brake control member 33 of the coupling member 30 are in the first position as shown in FIG. 3.

The clutch control member 32 in the first position holds the drive-side member 11 pressed against the driven-side member 12 with a force greater than the biasing force of the clutch biasing member 14. The biasing member 14 is then in a compressed state beyond an elastically deformed state, failing to compress further even if subjected to a greater force. The expression the "elastically deformed state" of the biasing member refers to the state of the member wherein a substantially proportional relationship can be established between the length of the biasing member and the resulting biasing force as the member is compressed from a spontaneous state free of any load. In the case where the biasing member 14 is in the above-mentioned compressed state, a force of frictional resistance occurs between the drive-side member 11 and the driven-side member 12 in corresponding relation with the magnitude of the force exerted by the clutch control member 32. The force of frictional resistance brings about the state of clutch on wherein the drive-side member 11 delivers a drive force to the driven-side member 12. According to the present embodiment, a thrust bearing 16 is interposed between the clutch control member 32 and the drive-side member 11 to prevent the abrasion of the control member 32.

On the other hand, there is a clearance between the brake control member 33 in the first position and the brake member 22, hence no braking force on the brake disk. Although the brake biasing member 25 is provided at the right side of the second brake member 23, the brake member 22, brake disk 21 and second brake member 23 are free to move laterally of the transmission (axially of the output shaft), so that no frictional force for braking is produced between the brake member 22 and the brake disk 21 unless the brake member 22 is pressed against the brake disk 21 against the biasing force of the brake biasing member 25. The brake device 20 therefore remains released.

Next described below is the state brought about by stepping on the coupling pedal completely, i.e., the state of brake on. When the coupling pedal is stepped on completely, the clutch control member 32 and the brake control member 33 of the coupling member 30 are in the second position as shown in FIG. 5.

The clutch control member 32 in the second position is spaced apart from the drive-side member 11 by a clearance, failing to produce sufficient frictional resistance between the drive-side member 11 and the driven-side member 12 for the delivery of the drive force. More specifically, when the clutch control member 32 is pivotally moved clockwise by stepping on the coupling pedal in its free state, the driven-side member 12 and the drive-side member 11 are moved rightward by the clutch biasing member 14. Since there is the clearance between the control member 32 and the drive-side member 11, however, no reaction to the biasing force of the biasing member 14 is produced, therefore falling to produce between the drive-side member 11 and the driven-side member a force of frictional resistance sufficient for the transmission of drive force. The clutch device is disengaged.

On the other hand, the brake control member 33 in the second position presses the brake member 22 against the brake disk 21 with a force greater than the biasing force of the brake biasing member 25. This force moves the brake member 22, brake disk 21 and second brake member 23 rightward together to compress the biasing member 25, producing a force of frictional resistance between the brake disk 21 and the brake members 22, 23 in corresponding relation with the magnitude of the force exerted by the brake control member 33 and consequently bringing about the state of brake on by the force of frictional resistance.

Finally a description will be given of the state brought about by stepping on the coupling pedal to a half extent, i.e., the state of clutch half-on. When the coupling pedal is stepped on by half, the clutch control member 32 and the brake control member 33 of the coupling member 30 are in an intermediate position between the first position and the second position as shown in FIG. 4.

The clutch control member 32 in the intermediate position presses the drive-side member 11 against the driven-side member 12 against the force of the clutch biasing member 14. The biasing member 14 is in an elastically deformed state at this time, consequently producing between the drive-side member 11 and the driven-side member 12 a force of frictional resistance corresponding to the magnitude of the biasing force of the biasing member 14. Accordingly, the clutch can be half-engaged when the clutch biasing member 14 has such a biasing force as to cause the driven-side member 12 to be rotated by the drive-side member 11 in sliding contact therewith.

On the other hand, the brake control member 33 presses the brake member 22 against the brake disk 21 against the biasing force of the brake biasing member 25. The biasing member 25 is in an elastically deformed state at this time, consequently producing between the brake disk 21 and the brake members 22 and 23 a force of frictional resistance corresponding to the magnitude of the biasing force of the biasing member 25. Accordingly, the brake can be half-applied if the brake biasing member 25 is adapted to exert the desired biasing force.

In the state of clutch half-on, it is required that the clutch biasing member 14 and the brake biasing member 25 be both held elastically deformed as previously described. Theoretically, this requirement can be fulfilled by arranging the clutch device 10 and the brake device 20 so that the spacing therebetween in the lateral direction is within a predetermined range. Stated more specifically, the state of clutch half-on can be realized by designing the lateral spacing between the clutch device 10 and the brake device 20 so that this spacing is smaller than the overall lateral width of the clutch control member 32 and the brake control member 33 when the clutch biasing member 14 and the brake biasing member 25 are both in a spontaneous state, and further so that the spacing is greater than the overall lateral width of the control members 32, 33 when the biasing members 14, 25 are both in the compressed state.

However, the lateral spacing between the clutch device 10 and the brake device 20 incorporated in the transmission as actually assembled is likely to differ from the designed value. Accordingly, if the lateral spacing is not adjustable in the assembled state of the transmission, there arises a need to disassemble and reassemble the transmission.

With the present embodiment, on the other hand, the clutch device 10, the coupling member 30 and the brake device 20 are arranged in this order laterally of the transmission as they are seen from above, and the position adjusting member 24 is provided for adjusting the position of the brake device 20 from outside the transmission casing 50 with respect to the lateral direction. Accordingly, the lateral spacing between the clutch device and the brake device is easily adjustable even after the transmission has been assembled, by adjusting the position of the brake device 20 in the lateral direction by the position adjusting member 24. More specifically, the position of the brake device 20 is so adjusted that the clutch biasing member 14 of the clutch device 10 and the brake biasing member 25 of the brake device 20 are both elastically deformed, with the coupling member 30 located at the intermediate position, whereby the state of clutch half-on is readily available although this state is conventionally difficult to accomplish.

The clutch-brake interlocking mechanism thus constructed according to the present embodiment further has the following advantage in addition to the advantage already described. The clutch device and the brake device are interlocked by the coupling member which is provided inside the transmission casing in place of the linkages conventionally disposed externally of the casing, so that the interlocking mechanism itself is simplified to make the transmission less costly. The interlocking mechanism is provided within the transmission and can therefore improved in durability.

Further with the present embodiment, the clutch biasing member 14 for half-engaging the clutch and the brake biasing member 25 for half-applying the brake are arranged inside the transmission. This arrangement makes it possible to adjust the state of clutch half-on on the transmission alone before the transmission is installed in the vehicle, consequently ensuring the adjusting work with an improved efficiency.

Embodiment 2

Figure 6:
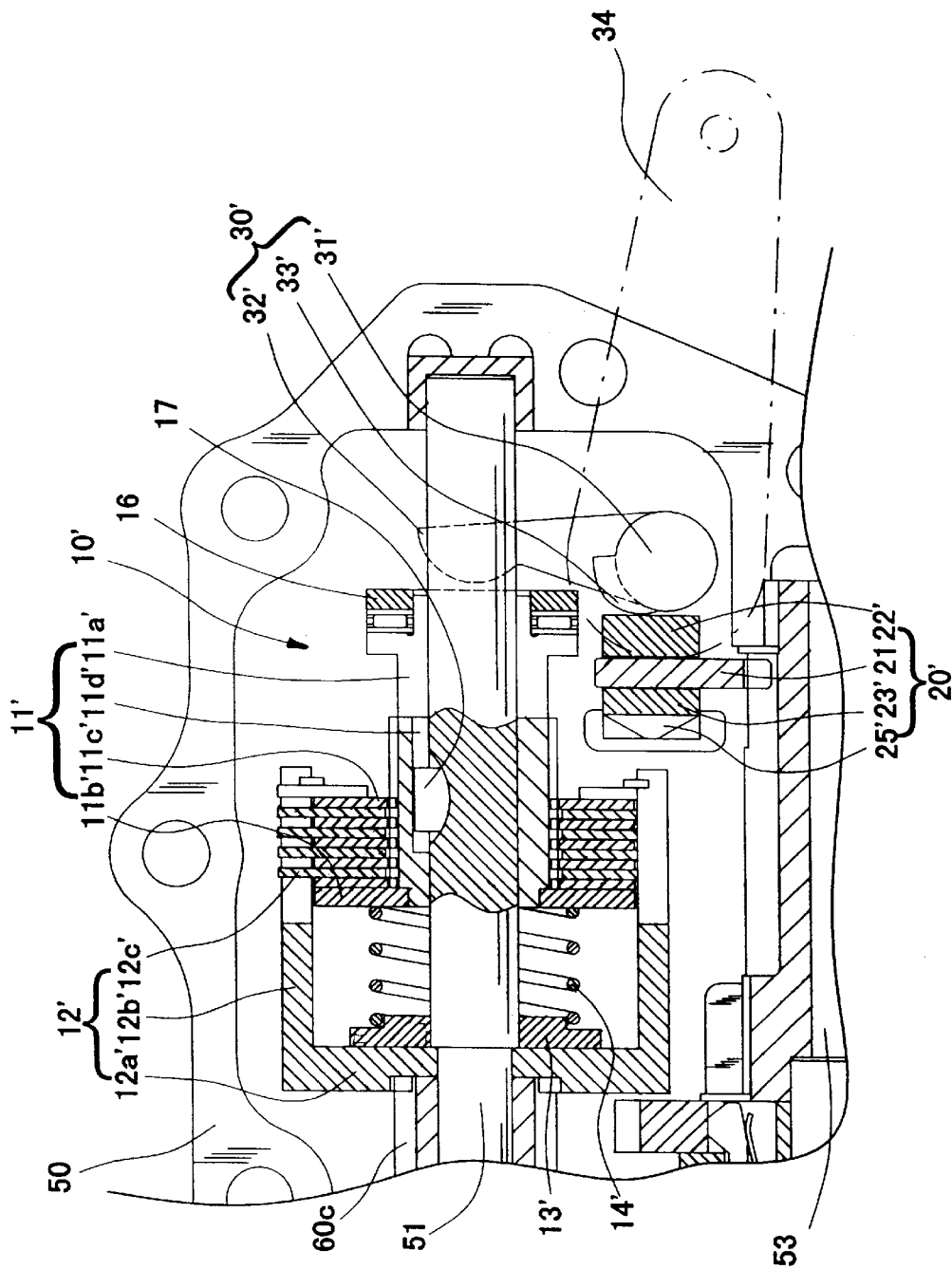
FIG. 6 is a plan view in section showing a preferred second embodiment of clutch-brake interlocking mechanism of the invention, with the clutch engaged and the brake released.
Figure 7:
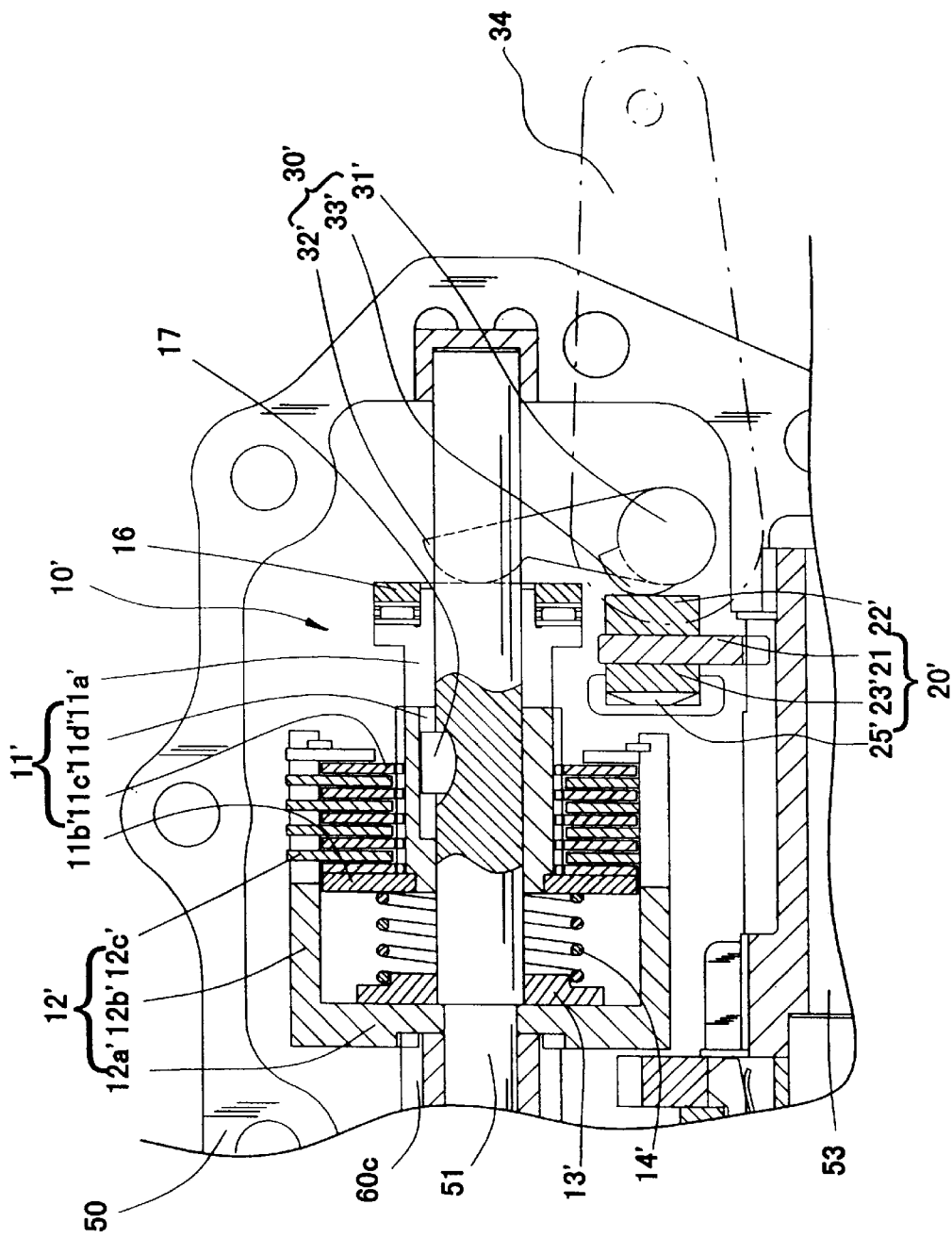
FIG. 7 is a plan view in section showing the interlocking mechanism of FIG. 6, with the clutch half-engaged and the brake half-applied.
Figure 8:
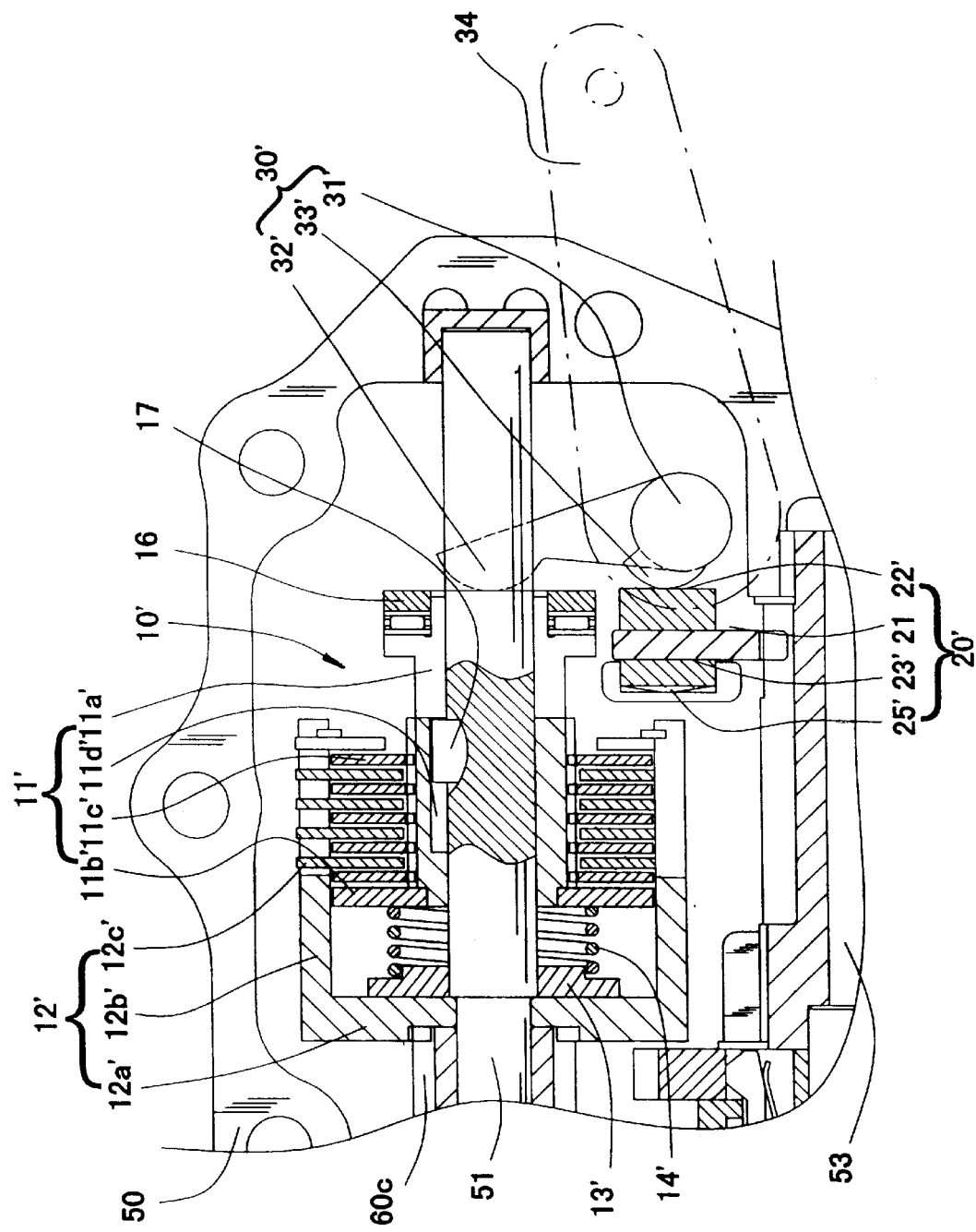
FIG. 8 is a plan view in section showing the interlocking mechanism of FIG. 6, with the clutch disengaged and the brake applied.

With reference to FIGS. 6 to 8, a description will be given below of a preferred second embodiment of clutch-brake interlocking mechanism according to the present invention. FIGS. 6 to 8 are plan views partly in section of a transmission having applied thereto the present embodiment to show the state of clutch on, the state of clutch half-on and the state of brake on, respectively. Throughout the drawings showing Embodiments 1 and 2, like parts are designated by like reference numerals and will not be described repeatedly.

The interlocking mechanism according to the present embodiment comprises a clutch device, 10', a brake device 20' disposed in the rear of the device 10', and a coupling member 30' disposed at the right side of these devices.

The clutch device 10' has, mounted on a first intermediate shaft 51, a driven-side member 12', clutch biasing member 14' and drive-side member 11' which are arranged in this order from the left side rightward.

The driven-side member 12' has a left end wall 12a' joined to a first speed-rearward common gear 60c nonrotatably relative thereto, a hollow cylinder 12b' extending rightward from the periphery of the left end wall 12a', and friction plates 12c' provided on the right end portion of the cylinder. Disposed at the right side of the left end wall in contact therewith is a member 13' for fixing the driven-side member 12' in position. The driven-side member 12' is made immovable axially of the shaft 51 by the common gear 60c and the position fixing member 13' which are arranged respectively at the left and right sides of the left end wall 12a'.

The drive-side member 11' has a sleeve 11a' supported by the first intermediate shaft 51, a left end plate 11b' provided at the left end of the sleeve 11a' and positioned inside the cylinder 12b' of the driven-side member, and friction plates 11c' fixed to the sleeve. The sleeve 11a' has a key groove 11d' formed in its inner periphery axially thereof and having a predetermined length, and is made nonrotatable relative to the first intermediate shaft 51 and movable axially thereof by a specified distance by means of a key 17.

The clutch biasing member 14' is interposed between the position fixing member 13' and the left end plate 11b' of the drive-side member for pressing the friction plates 11c' of the drive-side member against the friction plates 12c' of the driven-side member at all times.

The brake device 20' comprises a brake disk 21 supported by an output shaft 53 nonrotatably relative thereto and movably axially thereof, a brake member 22' positioned at the right side of the brake disk 21 and supported by a casing 50 movably laterally of the transmission (axially of the output shaft), a second brake member 23' disposed at the left side of the brake disk 21 and supported by the casing 50 laterally immovably, and a brake biasing member 25' for biasing the second brake member 23' toward the brake disk 21.

The coupling member 30' is disposed at the right side of the clutch device 10' and comprises a clutch control member 32' and a brake control member 33' which are opposed to the drive-side member 11' and the brake member 22', respectively.

The clutch control member 32' and the brake control member 33' move away from the drive-side member 11' and the brake member 22', respectively, with the clockwise rotation of the coupling member 30', and are adapted to exert an increased pressure on the drive-side member 11' and the brake member 22', respectively, as the coupling member 30' rotates counterclockwise. Stated more specifically, the clutch control member 32' is involute in shape, such that the distance between the point of contact of the member 32' with the drive-side member 11' and the center of rotation of the pivot 31' gradually increases with the counterclockwise rotation of the coupling member 30'. Similarly, the brake control member 33' is also involute in shape.

Described below is the operation of the mechanism thus constructed for interlocking the clutch device 10' and the brake device 20'.

When the coupling pedal is not stepped on in any way, the clutch control member and the brake control member of the coupling member 30' are in a first position providing a limit of clockwise movement thereof as seen in FIG. 6. The clutch control member 32' and the brake control member 33' in the first position exert substantially no pressure on the drive-side member 11' and the brake member 22', respectively.

The friction plates 11c' of the drive-side member 11' are pressed against the friction plates 12c' of the driven-side member 12' by the clutch biasing member 14' as previously described, with the rightward movement of the drive-side member 11' limited. In this state, therefore, a frictional force corresponding to the biasing force of the clutch biasing member 14' occurs between the drive-side member friction plates 11c' and the driven-side member friction plates 12c'. A drive force is delivered from the drive-side member 11' to the driven-side member 12' by this frictional force. Thus, the clutch control member 32' in the first position holds the clutch device 10' engaged.

On the other hand, there is a clearance between the brake control member 33' in the first position and the brake member 22', hence no braking force on the brake disk. Although the brake biasing member 25' is provided at the right side of the second brake member 23', the brake member 22', brake disk 21 and second brake member 23' are free to move laterally of the transmission (axially of the output shaft), so that no frictional force for braking is produced between the brake member 22' and the brake disk 21 unless the brake member 221 is pressed against the brake disk 21 against the biasing force of the brake biasing member 25'. The brake device 20' therefore remains released.

Next, a description will be given of the case wherein the coupling pedal is stepped on to a half extent. In this state, the clutch control member and the brake control member are in an intermediate position as pivotally moved counterclockwise through a predetermined angle from the first position as seen in FIG. 7.

The clutch control member 32' in this intermediate position presses the drive-side member 11' leftward with a predetermined force against the force of the clutch biasing member 14'. The predetermined force is dependent on the pivotally moved position of the clutch control member 32'. In this state, the drive-side member and the driven-side member are pressed against each other with their friction plates 11c' and 12c' by a force obtained by subtracting the force exerted by the clutch control member 32' from the biasing force of the clutch biasing member 14' in the first position. A frictional force smaller than the frictional force which is available at the first position is therefore produced between the friction plates 11c' and 12c' of the drive-side and driven-side members, whereby the clutch device is half-engaged with the driven-side member 12' rotating in sliding contact with the drive-side member 11'. In this way, the clutch control member 32' in the intermediate position half-engages the clutch device 10'.

On the other hand, the brake control member 33' in the intermediate position presses the brake member 22' against the brake disk 21 against the biasing force of the brake biasing member 25'. The biasing member 25' is in an elastically deformed state at this time, consequently producing between the brake disk 21 and the brake members 22' and 23' a force of frictional resistance corresponding to the magnitude of the biasing force of the brake biasing member 25'. Accordingly, the brake can be half-applied if the brake biasing member 25' is adapted to exert the desired biasing force. Thus, the brake control member 33' in the intermediate position renders the brake device 20' half-applied.

Finally a description will be given of the case wherein the coupling pedal is fully stepped on. The clutch control member 32' and the brake control member 33' in this state are in a counterclockwise limit position, i.e., a second position.

The clutch control member 32' in the second position presses the drive-side member 11' leftward with a force greater than the biasing force of the clutch biasing member 14', whereby the friction plates 11c' of the drive-side member are completely separated from the friction plates 12c' of the driven-side member. Consequently, the clutch device 10' is disengaged, completely disrupting the transmission of drive force from the drive-side member 11' to the driven-side member 12'. In this way, the clutch control member 32' in the second position disengages the clutch device 10'.

On the other hand, the brake control member 33' in the second position presses the brake member 22' against the brake disk 21 with a force greater than the biasing force of the brake biasing member 25'. This force moves the brake member 22', brake disk 21 and second brake member 23' leftward together to compress the biasing member 25', producing a force of frictional resistance between the brake disk 21 and the brake members 22', 23' in corresponding relation with the magnitude of the force exerted by the brake control member 33' and consequently bringing about the state of brake on by the force of frictional resistance. In this way, the brake control member 33' in the second position renders the brake device 20' actuated.

With the mechanism of the present embodiment for interlocking the clutch device and the brake device, these devices are interlocked by the coupling member 30' provided inside the transmission casing 50. The interlocking mechanism is therefore simplified to attain a cost reduction and an improvement in durability.

Although it is impossible to adjust the mechanism to the state of half-engaged clutch and half-actuated brake from outside the transmission as assembled unlike Embodiment 1, the adjustment can be made on the transmission alone before installation in a vehicle. The clutch and brake devices are therefore settable to the half-engaged or half-actuated state with greater ease than in the case with the conventional interlocking mechanism. Such setting must be done conventionally with the transmission installed in the vehicle, whereas the interlocking mechanism of the present embodiment ensures facilitated setting when the transmission is so assembled as to render the clutch and brake biasing members 14' and 25' elastically deformable.

The clutch device and the brake device, which are arranged in the right side space of the casing as seen from above according to the foregoing embodiments, can of course be positioned in the left side space conversely.

With the embodiments described above, the drive shaft and the driven shaft are arranged in the transmission transversely of the casing thereof, whereas these shafts can alternatively be arranged longitudinally of the casing. In this case, the left side or the right side referred to in the foregoing description corresponds to the front side or rear side, respectively.

Although the drive shaft and the driven shaft are arranged horizontally in the transmission according to the embodiments described, the invention is not limited by the direction or position of these shafts as supported. For example, the invention is applicable to a transmission wherein these shafts are arranged, for example, vertically, or to various other transmissions.

The first intermediate shaft is in the form of a single shaft according to the foregoing embodiments, whereas the drive-side member and the driven-side member can be mounted on separate shafts individually.

Although the brake disk is provided on the output shaft which is connected to the second intermediate shaft nonrotatably about the axis of the shaft relative thereto, the output shaft can alternatively be disposed immediately in the rear of the second intermediate shaft approximately in parallel thereto. In this case, the brake disk may be mounted on either one of the intermediate shaft and the output shaft.

We claim:

1. A clutch-brake interlocking mechanism for use in a gear transmission for starting and stopping a vehicle, the transmission having a casing, and a drive shaft and a driven shaft arranged approximately in parallel to each other within the casing, the mechanism being adapted to interlock a clutch device supported on the drive shaft with a brake device, the brake device having a brake disk supported on the driven shaft and a brake member disposed within the casing for applying a braking force to the brake disk, the clutch device being a friction clutch having a drive-side member and a driven-side member for producing a frictional force therebetween when the two clutch members are subjected to pressure to deliver a drive force from the drive-side member to the driven-side member, the brake device being a friction brake wherein the brake member is pressed against the brake disk to produce a frictional force therebetween for braking, the interlocking mechanism being characterized in that the mechanism comprises a coupling member including a pivot rotatably supported by the casing and having one end extending outward from the casing, and a clutch control member and a brake control member both arranged within the casing and pivotally movable with the rotation of the pivot; and a connecting member connecting said one end of the pivot to an operating member provided at a driver's seat, the clutch control member and the brake control member being pivotally movable with the movement of the operating member between a first position wherein the clutch device is engaged and the brake device is released and a second position wherein the clutch device is disengaged and the brake device is applied, and being positioned at an intermediate position, where is between the first position and the second position, wherein the clutch device is half-engaged and the brake device is half-applied.

2. A clutch-brake interlocking mechanism according to claim 1 which is characterized in that the pivot is provided at said one end with an arm pivotally movable with the rotation of the pivot within predetermined limits, the connecting member connecting the operating member to the arm, the arm being pivotally movable within the predetermined limits by the operating member to bring the clutch control member and the brake control member to the first position, the intermediate position and the second position.

3. A clutch-brake interlocking mechanism according to claim 1 which is characterized in that the drive-side member and the brake disk member are each movable axially thereof, the coupling member being disposed between the drive-side member and the driven side member, the clutch control member and the brake control member being positionable in the first position to press the drive-side member against the driven-side member with a first force without pressing the brake member by the brake control member, the clutch control member and the brake control member being positionable in the second position to press the brake member against the brake disk with a second force without pressing the clutch member by the clutch control member, the clutch control member and the brake control member being positionable in the intermediate position to press the drive-side member against the drive side member with a force smaller than the first force and press the brake member against the brake disk with a force smaller than the second force.

4. A clutch-brake interlocking mechanism according to claim 3 which is characterized in that the driven-side member is movable axially thereof, the clutch device further comprising a clutch position fixing member for determining a limit position of axial movement of the driven-side member toward one side, and a clutch biasing member provided between the clutch position fixing member and the driven-side member, the clutch biasing member being in a compressed state beyond an elastically deformed state, in an elastically deformed state and in a spontaneous state when the clutch control member is in the first position, the intermediate position and the second position, respectively.

5. A clutch-brake interlocking mechanism according to claim 3 which is characterized in that the brake member is movable axially thereof, the brake device further comprising a brake position fixing member for determining a limit position of axial movement of the brake disk toward the other side, and a brake biasing member provided between the brake position fixing member and the brake disk, the brake biasing member being in a spontaneous state, in an elastically deformed state and in a compressed state beyond the elastically deformed state when the brake control member is in the first position, the intermediate position and the second position, respectively.

6. A clutch-brake interlocking mechanism according to claim 5 which is characterized in that the brake position fixing member is adjustable in axial position from outside the transmission casing.

7. A clutch-brake interlocking mechanism according to claim 1 which is characterized in that the clutch device is a cone clutch having annular conical friction faces.

8. A clutch-brake interlocking mechanism according to claim 1 which is characterized in that the driven-side member and the drive-side member are arranged from one side toward the other side axially thereof and are respectively axially immovable and axially movable, the clutch device further comprising a clutch biasing member disposed between the driven-side member and the drive-side member for pressing a friction face of the drive-side member against a friction face of the driven-side member, the brake disk and the brake member being arranged from said one side toward the other side axially thereof so that the brake member is in approximately the same axial position as the drive-side member, the brake disk and the brake member being movable axially thereof, the coupling member being disposed at the other side of the drive-side member and the brake member, the clutch control member and the brake control member being positionable in the first position to engage the clutch device with the biasing force of the clutch biasing member without acting on the drive-side member and release the brake device without acting on the brake member, the clutch control member and the brake control member being positionable in the second position to disengage the clutch device by pressing the drive-side member against the driven-side member with a first force greater than the biasing force of the clutch biasing member and apply the brake device by pressing the brake member against the brake disk with a second force, the clutch control member and the brake control member being positionable in the intermediate position to half-engage the clutch device by pressing the drive-side member against the driven-side member with a force smaller than the first force and half-apply the brake device by pressing the brake member against the brake disk with a force smaller than the second force.

9. A clutch-brake interlocking mechanism for interlocking a brake with a clutch to prevent the brake and the clutch from being disengaged simultaneously, said interlocking mechanism comprising:

a friction clutch supported on a drive shaft said friction clutch comprising a drive-side member and a driven-side member, wherein the drive-side member and the driven-side member are engaged when one of the drive-side and the driven-side is pressed toward the other;

a friction brake supported on a driven shaft driven by the drive shaft, said friction brake comprising a brake member and a brake disk, wherein the brake member and the brake disk are engaged when one of the brake member or the brake disk is pressed toward the other; and a coupling member for pressing said one of the drive-side member or the driven-side and said one of the brake member or the brake disk, said coupling member being pivotable and having a structure such that when the coupling member is pivoted to a first position, the drive-die member and the driven-side member are fully engaged while the brake member and the brake disk are not engaged, when the coupling member is pivoted to a second position, the drive-side member and the driven-side member are not engaged while the brake member and the brake disk are fully engaged, and when the coupling member is pivoted between the first position and the second position, the drive-side member and the driven-side member are half-engaged while and the brake member and the brake disk are half-engaged.

10. A clutch-brake interlocking mechanism for use in a gear transmission for starting and stopping a vehicle, the transmission having a casing, and a drive shaft and a driven shaft arranged approximately in parallel to each other within the casing, the mechanism being adapted to interlock a clutch device supported on the drive shaft with a brake device, the brake device having a brake disk supported on the driven shaft and a brake member disposed within the casing for applying a braking force to the brake disk, the clutch device being a friction clutch having a drive-side member and a driven-side member for producing a frictional force therebetween when the two clutch members are subjected to pressure to deliver a drive force from the drive-side member to the driven-side member, the brake device being a friction brake wherein the brake member is pressed against the brake disk to produce a frictional force therebetween for braking, the interlocking mechanism being characterized in that the mechanism comprises a coupling member being a pivotable integrated piece including a pivot rotatably supported by the casing and having one end extending outward from the casing, and a clutch control member and a brake control member both arranged within the casing and pivotally movable with the rotation of the pivot; and a connecting member connecting said one end of the pivot to an operating member provided at a driver's seat, the clutch control member and the brake control member being pivotally movable with the movement of the operating member between a first position wherein the clutch device is engaged and the brake device is released and a second position wherein the clutch device is disengaged and the brake device is applied, and being positioned at an intermediate position, where is between the first position and the second position, wherein the clutch device is half-engaged and the brake device is half-applied.

11. A clutch-brake interlocking mechanism for interlocking a brake with a clutch to prevent the brake and the clutch from being disengaged simultaneously, said interlocking mechanism comprising:

a friction clutch comprising a drive-side member and a driven-side member, wherein the drive-side member and the driven-side member are engaged when one of the drive-side and the driven-side is pressed toward the other;

a friction brake comprising a brake member and a brake disk, wherein the brake member and the brake disk are engaged when one of the brake member or the brake disk is pressed toward the other; and a coupling member for pressing said one of the drive-side member or the driven-side and said one of the brake member or the brake disk, said coupling member being a pivotable integrated piece comprising (i) a clutch control member contacting said one of the drive-side member or the driven-side, and (ii) a brake control member contacting said one of the brake member or the brake disk, wherein said coupling member has a structure such that when the coupling member is pivoted to a first position, the drive-die member and the driven-side member are fully engaged while the brake member and the brake disk are not engaged, when the coupling member is pivoted to a second position, the drive-side member and the driven-side member are not engaged while the brake member and the brake disk are fully engaged, and when the coupling member is pivoted between the first position and the second position, the drive-side member and the driven-side member are half-engaged while and the brake member and the brake disk are half-engaged.

12. A clutch-brake interlocking mechanism for interlocking a brake with a clutch to prevent the brake and the clutch from being disengaged simultaneously, said interlocking mechanism comprising:

a friction clutch supported on a drive shaft, said friction clutch comprising a drive-side member and a driven-side member, wherein the drive-side member and the driven-side member are engaged when one of the drive-side and the driven-side is pressed toward the other;

a friction brake supported on a driven shaft driven by the drive shaft, said friction brake comprising a brake member and a brake disk, wherein the brake member and the brake disk are engaged when one of the brake member or the brake disk is pressed toward the other; and a coupler for coupling said friction clutch and said friction brake, said coupler being a pivotable integrated piece having two contacting areas, one contacting an area (a) of said one of the drive-side member or the driven-side, the other contacting an area (b) of said one of the brake member or the brake disk, said coupler having a structure such that when the coupler is pivoted to a first position, the coupler presses area (a) to render the drive-die member and the driven-side member fully engaged while the brake member and the brake disk are not engaged, when the coupler is pivoted to a second position, the coupler presses area (b) to render the brake member and the brake disk fully engaged while the drive-side member and the driven-side member are not engaged, and when the coupler is pivoted between the first position and the second position, the coupler presses areas (a) and (b) to render the drive-side member and the driven-side member half-engaged and to render the brake member and the brake disk half-engaged.

* * * * *